US012754056B2

(12) United States Patent
Oßwald et al.

(10) Patent No.: US 12,754,056 B2
(45) Date of Patent: Oct. 6, 2026

(54) MODULAR FIELD DEVICE

(71) Applicant: Endress+Hauser SE+Co. KG, Maulburg (DE)

(72) Inventors: Dirk Oßwald, Schopfheim (DE); Ralf Armbruster, Schallstadt (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 242 days.

(21) Appl. No.: 18/684,731

(22) PCT Filed: Jul. 22, 2022

(86) PCT No.: PCT/EP2022/070616

§ 371 (c)(1),
(2) Date: Feb. 19, 2024

(87) PCT Pub. No.: WO2023/020780

PCT Pub. Date: Feb. 23, 2023

(65) Prior Publication Data

US 2024/0377240 A1 Nov. 14, 2024

(30) Foreign Application Priority Data

Aug. 19, 2021 (DE) ..................... 10 2021 121 547.1

(51) Int. Cl.
*G01F 23/284* (2006.01)
*H01Q 1/22* (2006.01)

(52) U.S. Cl.
CPC ........... *G01F 23/284* (2013.01); *H01Q 1/225* (2013.01)

(58) Field of Classification Search
CPC ....... G01F 23/284; G01F 15/14; H01Q 1/225; G01D 11/24; G01D 21/00; G01S 13/88; G01S 7/027
See application file for complete search history.

(56) References Cited

U.S. PATENT DOCUMENTS 6,148,681 A * 11/2000 Gravel ................. H01R 13/527 73/866.5
7,550,826 B2 * 6/2009 Orth ..................... H05K 9/0049 257/659

(Continued)

FOREIGN PATENT DOCUMENTS

DE 202006001904 U1 5/2006
DE 102016104739 A1 9/2017
DE 102017119358 A1 2/2019

*Primary Examiner* — Yonghong Li

(74) *Attorney, Agent, or Firm* — Mark A. Logan; Endress+Hauser (USA) Holding, Inc.

(57) ABSTRACT

A modular field device includes a housing having a first housing part for a first electronics module and a separate, second housing part for a second electronics module. The housing parts are connected and the interiors thereof are interconnected, and the housing parts are rotatable relative to one another along a common housing axis. The field device comprises, in the housing interior, a transmission means which mechanically couples the second electronics module in the interior of the second housing part to the first housing part so that a rotation of the first housing part relative to the second housing part about the housing axis rotates the second electronics module. The electrical connection between the modules does not thus restrict the rotatability of the housing parts relative to one another.

6 Claims, 3 Drawing Sheets

(56) References Cited

U.S. PATENT DOCUMENTS

| | | | | |
|---|---|---|---|---|
| 11,162,828 | B2 * | 11/2021 | Kawashima | G01D 11/30 |
| 2010/0188296 | A1 | 7/2010 | Gard | |
| 2010/0231438 | A1 * | 9/2010 | Ohlsson | G01F 23/284<br>73/290 V |
| 2019/0063648 | A1 * | 2/2019 | Chen | F16L 15/08 |
| 2020/0286306 | A1 | 9/2020 | Rodriguez et al. | |

* cited by examiner

MODULAR FIELD DEVICE

CROSS-REFERENCE TO RELATED APPLICATIONS

The present application is related to and claims the priority benefit of DPMA Patent Application No. 10 2021 121 547.1, filed on Aug. 19, 2021, and International Patent Application No. PCT/EP2022/070616, filed Jul. 22, 2022, the entire contents of which are incorporated herein by reference.

TECHNICAL FIELD

The invention relates to a field device that can be designed in a modular manner.

BACKGROUND

In process automation, corresponding field devices are used for capturing relevant process parameters. For the purpose of capturing the different process parameters, suitable measuring principles are therefore implemented in the corresponding field devices, in order to capture as process parameters, for example, a fill-level, a flow, a pressure, a temperature, a pH value, a redox potential, or a conductivity. The Endress+Hauser corporate group manufactures and distributes a wide variety of field devices.

For measuring the fill level of filling materials in containers, contactless measuring methods have become established, because they are robust and require minimum maintenance. A further advantage of contactless measuring methods consists in the ability to be able to measure the fill level quasi-continuously. Radar-based measuring methods are therefore predominantly used in the field of continuous fill-level measurement (in the context of this patent application, "radar" refers to signals or electromagnetic waves with frequencies between 0.03 GHz and 300 GHz). An established measurement method is FMCW ("frequency-modulated continuous wave"). The FMCW-based fill-level measuring method is described, for example, in published patent application DE 10 2013 108 490 A1.

In principle, the antenna arrangement of radar-based fill-level measuring devices should be attached to the container interior with direct contact, since no barrier that is impermeable to radar signals may be present between the antenna arrangement and the filling material. However, especially for explosion protection purposes, a spatial separation between the active modules, i.e., the modules supplied with electricity, and the passive transmitting/receiving antenna is often required. For this purpose, the fill-level measuring device comprises a measuring device neck via which the antenna is connected to that housing part in which, in particular, temperature-sensitive electronics modules of the fill-level measuring device, such as interface modules for communication to the outside, are accommodated. In this case, a corresponding explosion protection barrier is arranged in the measuring device neck of the antenna. In addition or as an alternative to explosion protection requirements, the measuring device neck must optionally fulfill further protective functions: depending upon the application, high temperatures, high pressures, or dangerous gases prevail in the interior of the container. Therefore, the measuring device neck must function as a pressure seal, temperature barrier, and/or as a media seal, depending upon the application.

So that the upper housing part and the interface modules located in the interior can also serve as a platform for further field device types, in addition to fill-level measuring devices, and so that the device can be designed to be more compact overall, the high-frequency module, which is specifically for radar-based fill-level measuring devices, can be transferred to the measuring device neck. It is also advantageous if the upper housing part facing away from the container, together with the modules located on the inside, is mounted so as to be rotatable relative to the device housing, in relation to the axis of the measuring device axis. As a result, any displays or cable outlets on the upper housing part of the field device can be flexibly aligned depending upon its installation situation in the process facility. However, this is limited or prevented by the required electrical connection between the high-frequency module arranged in the measuring device neck and the electronics module arranged in the upper housing part.

SUMMARY

The invention is therefore based upon the object of providing a compact and flexibly installable fill-level measuring device on a modular basis.

The invention achieves this object with a field device comprising at least the following components:

- a housing, comprising
  - a first housing part that forms a first interior,
  - a second housing part that forms a second interior that adjoins the first interior, and
  - a connecting means, such as a screw connection, that mechanically connects the first housing part to the second housing part such that the housing parts are rotatable relative to one another by at least 90° in relation to a common housing or screw axis,
- a first electronics module that is arranged rigidly in the first interior, and
- a second electronics module that is arranged in the second interior.

According to the invention, the field device is characterized in that the second electronics module is arranged in the second interior so as to be rotatable in relation to the housing axis. A transmission means is provided that mechanically connects the second electronics module to the first electronics module and/or the first housing part so that the transmission means transmits a rotation of the first housing part relative to the second housing part, in relation to the housing axis, to the second electronics module. As a result, the rotatability of the housing parts relative to one another is not limited by the electrical connection between the modules, such that the final assembly of the modular field device and/or the alignment of the field device in the process facility is facilitated.

In the context of the invention, the term, "module," is understood in principle to mean a separate arrangement or encapsulation of the electronic circuits that are provided for a specific application—for example, for high-frequency signal processing or as an interface. Depending upon the application, the corresponding module may therefore comprise corresponding analog circuits for generating or processing corresponding analog signals. However, the module can also comprise digital circuits, such as FPGAs, microcontrollers, or storage media in conjunction with appropriate programs. The program is designed to carry out the required method steps or to apply the necessary computing operations. In this context, different electronic circuits for the module in the sense of the invention can also potentially access a common physical memory or be operated by means of the same physical digital circuit. In this case, it does not matter whether different electronic circuits within the module are arranged on a common printed circuit board or on several interconnected printed circuit boards.

If the second electronics module is rotatable in relation to the housing axis, but is fixed in a non-displaceable manner in the second interior, an electrical, freely rotatable plug contact can also be arranged between the second housing part and a side of the second electronics module facing away from the first electronics module in the direction of the housing axis, in order to connect any sensors of the field device, such as temperature sensors or radar antennas.

In the event that the second electronics module is arranged so as to be non-displaceable in the second interior in relation to the housing axis, and the connecting means is designed as a screw connection, the transmission means must be designed such that it can, in relation to the housing axis, compensate for a defined change in distance of the second electronics module to the first housing part, which change in distance is caused by a rotation at the screw connection.

The idea according to the invention can in particular be implemented in modularly constructed, radar-based fill-level measuring devices, in that, for example, the second electronics module serves to generate a radar signal to be transmitted and/or to determine the fill level on the basis of a received radar signal, and in that the electrical plug contact serves as a high-frequency connection to a transmitting/receiving antenna.

With respect to the transmission means, it is particularly advantageous if it comprises a separator arranged between the modules, which separator is made of an electrically insulating material, in order to form an electrical shield or insulation of the electrical connection with respect to the housing. Corresponding to the field device according to the invention, the object upon which the invention is based is also achieved by a method for assembling the field device. Accordingly, the method comprises at least the following method steps:

- inserting the first electronics module into the interior of the first housing part,
- electrically contacting the first electronics module with the second electronics module via an electrical connection,
- inserting the second electronics module into the interior of the second housing part before or after the second electronics module is electrically contacted with the first electronics module, and
- fastening the first housing part to the second housing part by means of the rotatable connecting means so that the transmission means transmits a rotation of the first housing part relative to the second housing part, in relation to the housing axis, to the second electronics module.

BRIEF DESCRIPTION OF THE DRAWINGS

The present disclosure will be explained in more detail with reference to the following figures. In the figures.

DETAILED DESCRIPTION

Figure 1:
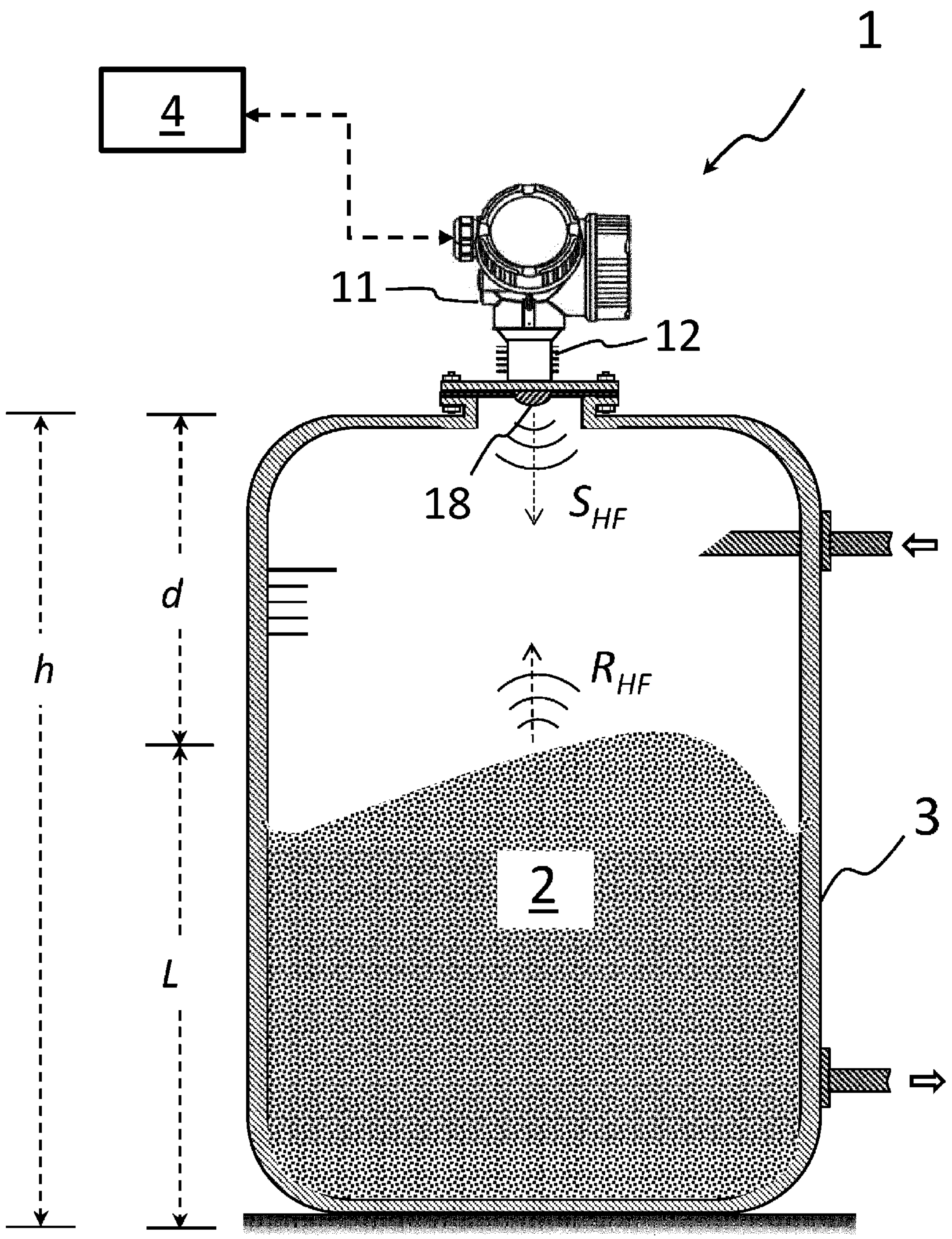
FIG. 1 shows a radar-based fill-level measuring device on a container.

For basic understanding, the invention is illustrated in the following figures using a radar-based fill-level measuring device 1: Accordingly, in FIG. 1, a container 3 with a filling material 2 is shown, the fill level L of which container is to be determined. The container 3 can be up to more than 100 m high, depending upon the type of filling material 2 and field of application. The conditions in the container 3 are also dependent upon the type of filling material 2 and the field of application. In the case of exothermic reactions, for example, high temperature and pressure stresses can occur. In the case of dust-containing or flammable substances, appropriate explosion protection conditions must be observed in the container interior.

To be able to determine the fill level L independently of the prevailing conditions, the fill-level 30 measuring device 1 is attached to the container 3 at a known installation height h above the filling material 2. In this case, the fill-level measuring device 1 is fastened to or oriented towards a corresponding opening of the container 3 in such a way that an antenna 18 of the fill-level measuring device 1 is directed vertically downwards into the container 3 towards the filling material 2.

Radar signals $S_{HF}$ are transmitted via the antenna 18 vertically downwards in the direction of the surface of the filling material 2. After reflection on the filling material surface, the fill-level measuring device 1 receives the reflected radar signals $R_{HF}$ again via the antenna 18. In this case, the signal travel time t between transmission and reception of the corresponding radar signals $S_{HF}$, $R_{HF}$ is, according to $$t = \frac{2 * d}{c},$$

proportional to the distance d between the fill-level measuring device 1 and the filling material 2, wherein c is the radar propagation speed corresponding to the speed of light. The signal travel time t can be determined by the fill-level measuring device 1, for example, by means of the FMCW or pulse propagation method. This allows the fill-level measuring device 1, for example, to assign the measured travel time t to the given distance d on the basis of a corresponding calibration. In this way, the fill-level measuring device 1 can, according to $$d = h - L,$$

in turn determine the fill level L, provided the installation height h is stored in the fill-level measuring device 1. The antenna 18 is controlled by signals from a high-frequency module 15 within the fill-level measuring device 1. In this case, the FMCW or pulse propagation measuring principle is implemented in the high-frequency module 15 as the measuring principle for generating the radar signal $S_{HF}$ to be transmitted and for determining the signal travel time t on the basis of the incoming reception signal $R_{HF}$, for example.

In general, the fill-level measuring device 1 is connected to a superordinate unit 4, such as a local process control system or a decentralized server system, via a separate interface module 14, such as "4-20 mA," "PROFIBUS," "HART," or "Ethernet." In this way, the measured fill-level value L can be transmitted, for example, in order to control the flow to or discharge from the container 3 if necessary. However, other information about the general operating state of the fill-level measuring device 1 can also be communicated. The separate accommodation of the interfaces in a separate module 14 has the advantage that, in addition to fill-level measuring devices, it can also be used in other modular field devices.

Except for the antenna 18, all other components 11, 12 or modules 14, 15 of the fill-level measuring device 1 are arranged outside the container 3 in order on the one hand to ensure explosion protection inside the container 3 in front of the electrical modules 14, 15 of the fill-level measuring device 1. On the other hand, the electronics modules 14, 15 are thereby protected against temperature and pressure loading from the container interior. Accordingly, as shown in more detail in FIG. 2, the interface module 14 is arranged in an interior of a first housing part 11, which is spaced apart from the antenna 18 by a second housing part in the form of a measuring device neck 12. As is indicated in FIG. 1 and FIG. 2, the measuring device neck 12 can additionally have appropriate cooling ribs for thermal decoupling.

Figure 2:
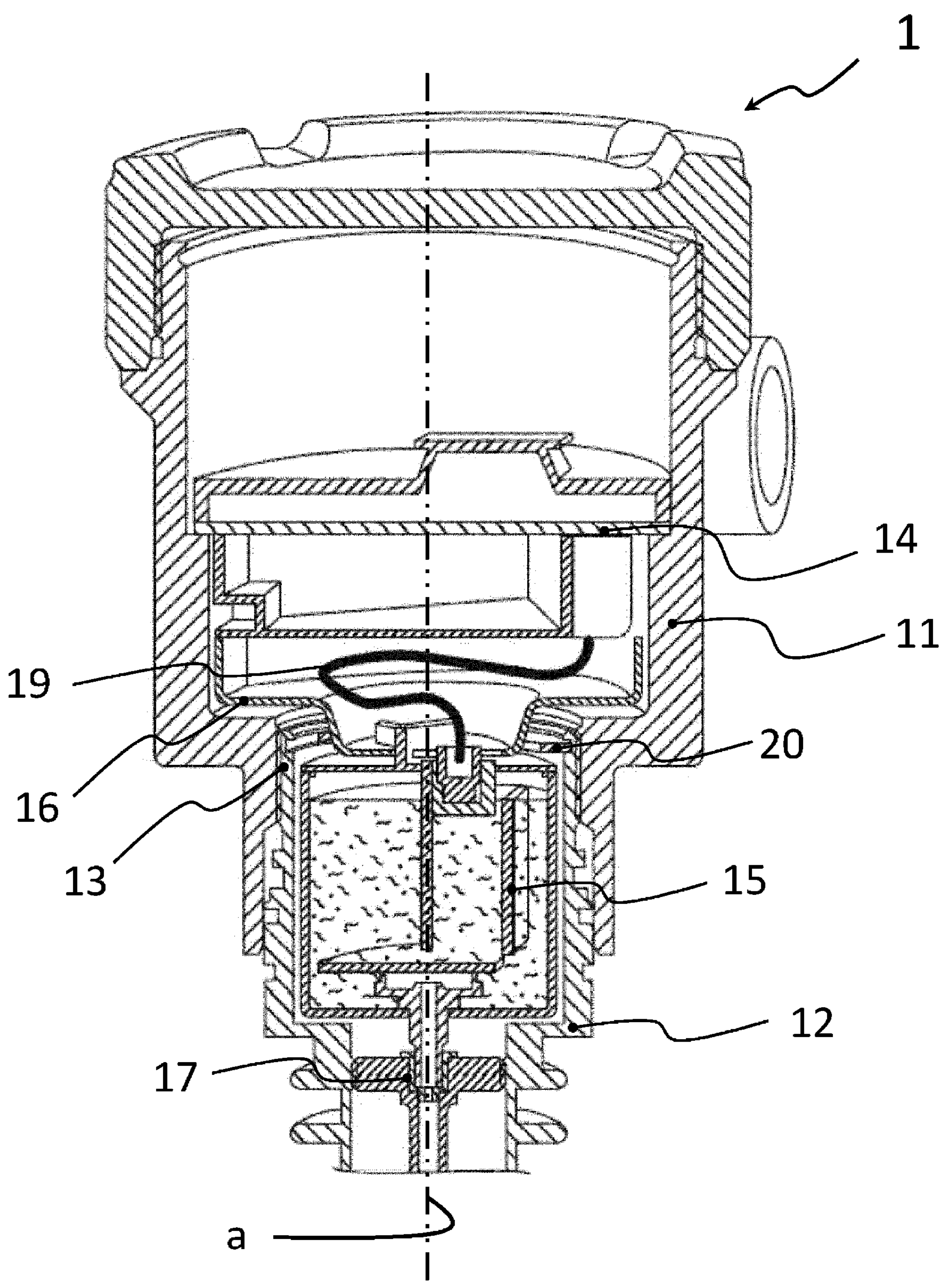
FIG. 2 shows a cross-sectional view of the fill-level measuring device according to the present disclosure.

As illustrated in the embodiment shown in FIG. 1, the first housing part 11 can, for example, be connected to the measuring device neck 12 via a screw connection 13, wherein the screw connection 13 defines a common housing axis a. In the exemplary embodiment shown, the first housing part 11 comprises a corresponding internal thread in its first interior. A corresponding external thread is arranged on the measuring device neck 12 so that the interior of the measuring device neck 12 is connected to the interior of the first housing part 11. An advantage of such a connecting means 13, by means of which the first housing part 11 can be rotated relative to the housing neck 12, in relation to the housing axis a, is that any displays or cable feedthroughs on the upper, first housing part 11 can be flexibly aligned in the process facility even if the measuring device neck 12 is rigidly connected to the container 3.

Because the high-frequency module 15 must be arranged as close as possible to the antenna 18 for low-loss and low-interference transmission, the high-frequency module 15 is arranged below the first housing part 11 in the measuring device neck 12 and is connected to the antenna 18, via an electrical HF plug contact 17, on a side of the second electronics module 15 facing away from the 20) first electronics module 14. The high-frequency module 15 is also enclosed by an encapsulation that can be made of a plastic, such as PC, PE, PP, or PA. This makes it possible to additionally encapsulate the interior of the high-frequency module 15 by means of a potting compound for explosion protection.

A corresponding electrical connection 19 between the two modules 14, 15 is required at least to transmit the fill-level value L to the interface module 14, or to transmit calibration or parameterization data to the high-frequency module 15. When the first housing part 11 is attached to the measuring device neck 12 during final assembly of the fill-level measuring device 1 or during alignment of the first housing part 11 during installation of the fill-level measuring device 1 on the container 3, such an electrical connection 19 has a very limiting effect, depending upon the design, because it allows only limited rotation of the first housing part 11 relative to the measuring device neck 12, in relation to the common housing axis a.

According to the invention, the high-frequency module 15 is therefore arranged in the interior of the measuring device neck 12 so as to be freely rotatable in relation to the housing axis a. For this purpose, the high-frequency plug contact 17 is aligned along the axis a and freely rotatable. The high-frequency plug contact 17 can be designed, for example, as a hollow conductor plug contact or as a plug contact for a dielectric waveguide. Furthermore, a wave spring (not explicitly shown) presses the high-frequency module 15 with a defined force against the antenna 18 from the interior of the measuring device neck 12, guided by corresponding guide elements.

In this case, the wave spring is clamped in the interior of the measuring device neck 12 between a groove or a corresponding locking ring 20 and the outer side of the of the high-frequency module 15 facing away from the high-frequency plug contact 17. As a result, the second high-frequency module is arranged in the interior of the measuring device neck 12 so as to be freely rotatable and at the same time non-displaceable in relation to the housing axis a.

Furthermore, according to the invention, a transmission means 16 is arranged between the first housing part 11 and the measuring device neck 12, which transmission means mechanically couples the high-frequency module 15 to the first housing part 11 in such a way that any rotation of the first housing part 11 relative to the second housing part 12, in relation to the housing axis a, is transmitted to the second electronics module 15. The advantage of this is that the electrical connection 19 does not hinder any rotation of the first housing part 11 relative to the measuring device neck 12 due to the transmission of the rotation 19—for example, when the first housing part 11 is screwed to the measuring device neck 12, or when the first housing part 11 is aligned in the process facility. The susceptibility to errors during the final assembly of the fill-level measuring device 1 is thereby reduced, wherein the final assembly can be carried out on the basis of the following method steps:

- inserting the first interface module 14 into the interior of the first housing part 11,
- electrically contacting the interface module 14 with the high-frequency module 15 via the electrical connection 19,
- inserting the high-frequency module 15 into the interior of the measuring device neck or the second housing part 12 before or after the high-frequency module 15 is electrically contacted with the interface module 14, and
- fastening the first housing part 11 to the measuring device neck 12 via the screw connection or the rotatable connecting means 13, so that the transmission means 16 transmits any rotations of the first housing part 11 relative to the second housing part 12, in relation to the housing axis a, to the high-frequency module 15.

It is conceivable for the first housing part 11 to be fastened to the measuring device neck 12 before or after the measuring device neck 12 is fixed to the container 3.

As an alternative to the embodiment variant shown, according to the idea according to the invention, it is also possible to mechanically couple the high-frequency module 15, not directly to the first housing part 11, but to the first electronics module 14, because said first electronics module is rigidly connected to the first housing part 11. In this case, too, a rotation of the first housing part 11 is transmitted to the high-frequency module 15.

Figure 3:
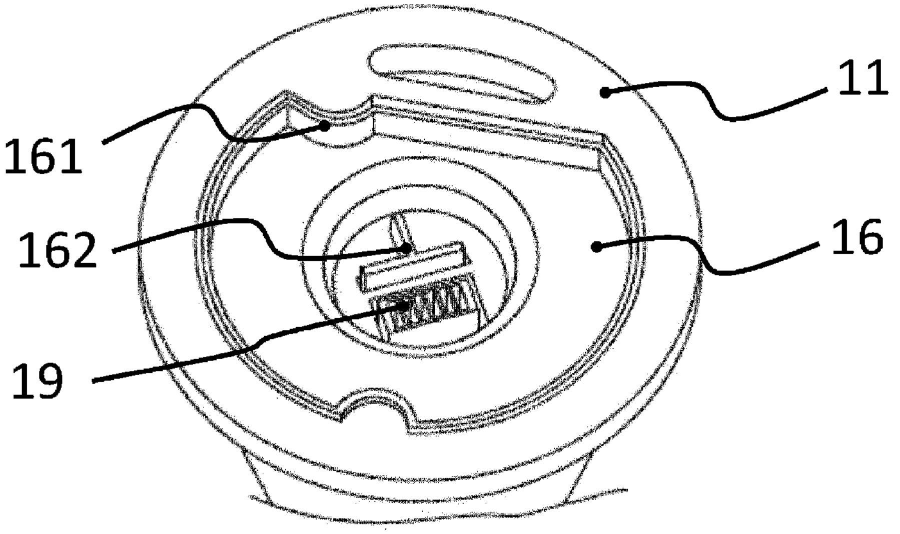
FIG. 3 and FIG. 4 show detailed views of the fill-level measuring device in the region of the transmission means.

The embodiment of the transmission means 16 according to the invention shown in FIG. 2 will be explained in more detail with reference to FIG. 3 and FIG. 4. Accordingly, the transmission means 16 comprises a separator formed to be approximately orthogonal to the axis a, which separator is arranged between the interface module 14 and the high-frequency module 15. In this case, the separator is bent towards the high-frequency module 15 and is preferably made of an electrically insulating material, in order to electrically shield the electrical connection cable 19 from the first housing part 11 and/or from the second housing part 12.

In relation to the axis a, an edge region of the separator comprises two, approximately opposite and axially aligned grooves 161. After the separator has been inserted into the first interior of the first housing part 11, two corresponding engagements of the first housing part 11 engage in the grooves 161, as can be seen from FIG. 3. Axial rotations of the first housing part 11 in relation to the measuring device neck 12 are thereby transmitted to the separator. For further transmission of the rotation from the separator to the high-frequency module 15, a T-shaped feedthrough 162 is embedded in the separator close to or orthogonal to the common housing axis a. The feedthrough 162 guides a T-shaped profile that is extruded in a correspondingly T-shaped manner along the axis a, starting from the encapsulation of the high-frequency module 15. Through the T-shape of the profile or of the feedthrough 162, axial rotations of the first housing part 11 are transmitted further to the high-frequency module 15 via the separator of the transmission means 16. It goes without saying that, in the sense of the invention, any other shape by means of which a rotation can be transmitted can also be implemented instead of the T-shape.

Figure 4:
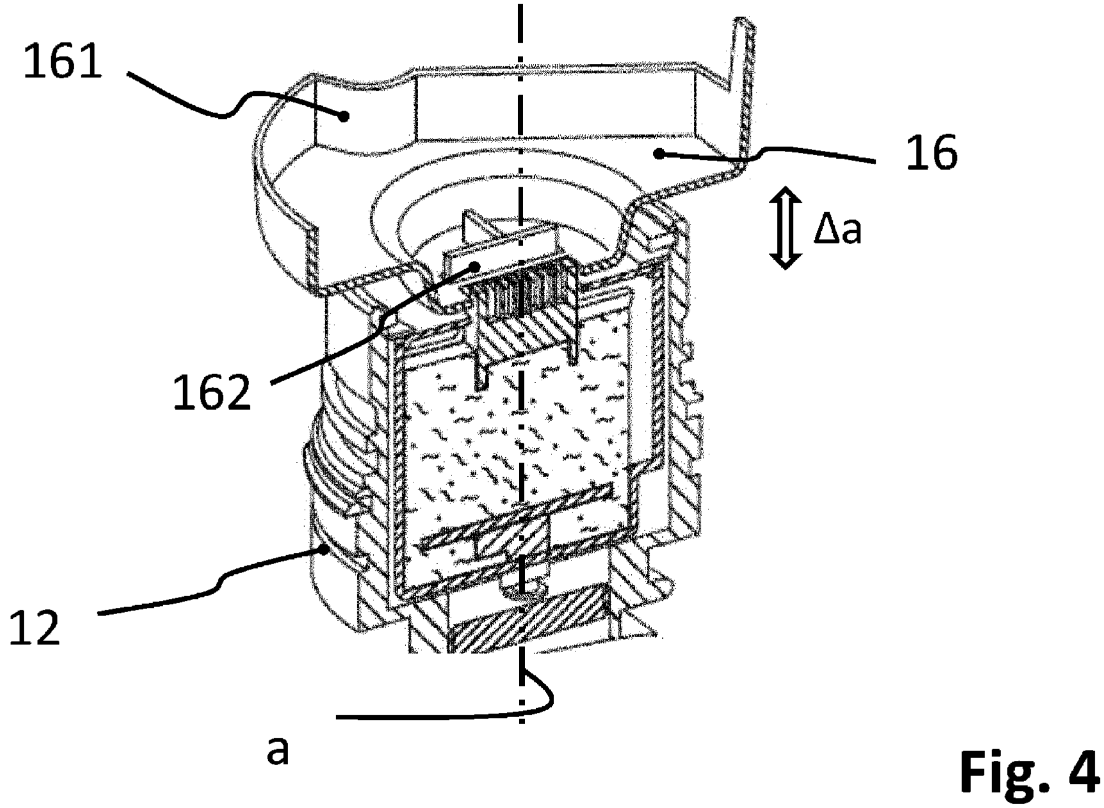

As can be seen from FIG. 4, the T-shaped profile 162 on the high-frequency module 15 is extruded so as to be structurally longer than a defined minimum length Aa, wherein the minimum length corresponds to that axial change in distance Aa between the high-frequency module 15 and the first housing part 11 which results from screwing the screw connection 13 over the entire thread length. As a result, the embodiment variant of the transmission means 16 shown increases the resulting change in distance Aa between the second electronics module 15 and the first electronics module 14 or the first housing part 11. It is therefore not limiting for the transmission means 16 that the high-frequency module 15 is optionally arranged in the interior of the measuring device neck 12 so as to be non-displaceable in relation to the housing axis a.

In contrast to the embodiment variant of the transmission means 16 based upon the separator shown, it is also conceivable in the context of the invention to design the transmission means 16 exclusively as integral components of the modules 14, 15 or of the first housing part 11. For this purpose, the feedthrough 162 can be designed, for example, as an integral part of the first housing 11.

Although the idea according to the invention is illustrated in FIG. 1 to FIG. 4 by means of a radar-based fill-level measuring device 1, it can also be generally applied to field devices, provided that, instead of the high-frequency module, the field device generally has a second electronics module 15, or if it generally comprises a second housing part 12 instead of the measuring device neck. The connecting means 13 does not necessarily have to be designed as a screw connection, provided that, as for example in the case of the bayonet securement, it is able to be rotated by at least 90° and accordingly connects the housing parts 11, 12 of the field device housing or their interiors along the common housing axis a.

The invention claimed is:

1. A field device, comprising:

a housing including a first housing part that forms a first interior, a second housing part that forms a second interior that adjoins the first interior, and a connecting means that mechanically connects the first housing part to the second housing part such that the first housing part and the second housing part are rotatable relative to one another by at least 90° about a common housing axis;

a first electronics module that is arranged rigidly in the first interior;

a second electronics module that is arranged in the second interior so as to be rotatable about the housing axis and non-displaceable in relation to the housing axis;

a transmission means that mechanically connects the second electronics module to the first electronics module and/or to the first housing part so that the transmission means transmits a rotation about the housing axis of the first housing part relative to the second housing part to the second electronics module; and an electrical plug contact that is arranged so as to be freely rotatable about the housing axis between the second housing part and a side of the second electronics module facing away from the first electronics module.

2. The field device according to claim 1, wherein the connecting means is a screw connection, and wherein the transmission means is designed to be mechanically flexible in such a way that, in relation to the housing axis, a defined change in distance caused by a rotation at the screw connection of the second electronics module to the first electronics module or to the first housing part is compensated for.

3. The field device according to claim 1, wherein the field device is designed as a radar-based fill-level measuring device, wherein the second electronics module serves to generate a radar signal to be transmitted and/or to determine the radar-based fill level on the basis of a received radar signal, and wherein the electrical plug contact serves as a high-frequency connection to a transmitting/receiving antenna.

4. The field device according to claim 1, wherein the connecting means is designed as a screw connection, such that a screw axis runs congruently with the housing axis.

5. The field device according to claim 1, wherein the transmission means includes a separator arranged between the first electronics module and the second electronic module and the separator is made of an electrically insulating material.

6. A method for assembling the field device of claim 1, the method comprising:

inserting the first electronics module into the first interior of the first housing part;

inserting the second electronics module into the second interior of the second housing part;

electrically contacting the first electronics module with the second electronics module via an electrical connection; and fastening the first housing part to the second housing part via the connecting means so that the transmission means transmits a rotation about the common housing axis of the first housing part relative to the second housing part to the second electronics module.

* * * * *